DISPENSER WITH CUP SUPPORTING BRISTLES
Original Filed March 4, 1966
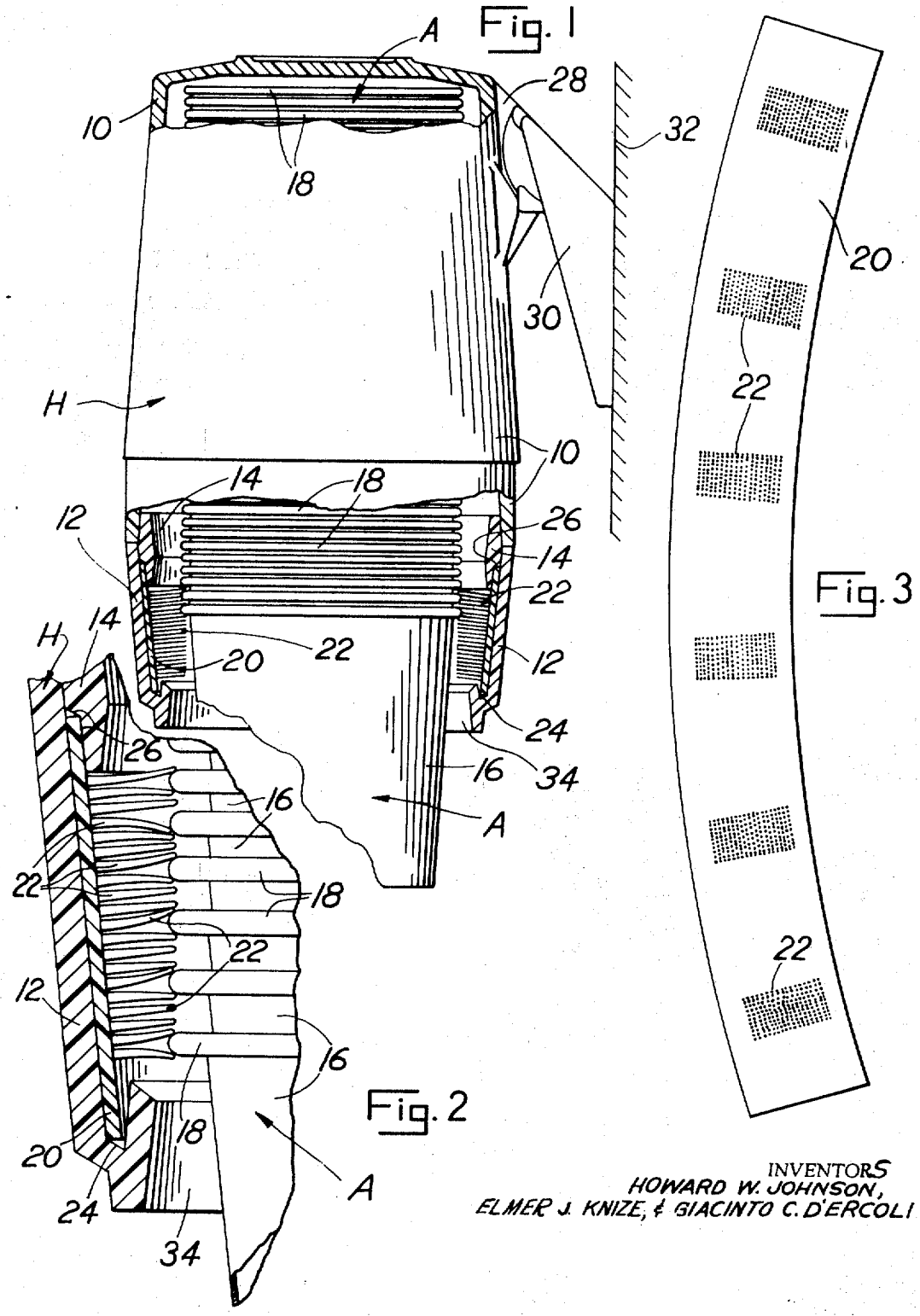
INVENTORS
HOWARD W. JOHNSON,
ELMER J. KNIZE, & GIACINTO C. D'ERCOLI United States Patent Office Re. 27,297
Reissued Feb. 22, 1972

27,297

DISPENSER WITH CUP SUPPORTING BRISTLES

Howard W. Johnson and Giacinto C. D'Ercoli, Park Forest, and Elmer J. Knize, Chicago, Ill., assignors to Solo Cup Company, Chicago, Ill.

Original No. 3,342,375, dated Sept. 19, 1967, Ser. No. 531,842, Mar. 4, 1966. Application for reissue June 16, 1969, Ser. No. 835,905
(Filed under Rule 47(a) and 35 U.S.C. 116)
Int. Cl. A47f *1/04*
U.S. Cl. 221—308 10 Claims

Matter enclosed in heavy brackets [ ] appears in the original patent but forms no part of this reissue specification; matter printed in italics indicates the additions made by reissue.

ABSTRACT OF THE DISCLOSURE

The specification discloses a cylindrical dispenser for paper or plastic cups having a tapered open end through which the cups are put into or taken out of the dispenser. At the lower open end, bristles project toward the axis of the cylinder for supporting a stack of nested cups. The bristles are of progressively shorter length and therefore stiffer toward the open end whereby the lower stiffer bristles provide good support for the stack while the longer, less stiff bristles assist in separating the nested cups to facilitate removing only one at a time.

This invention relates to a dispenser for stacked container articles such as paper or plastic disposable cups.

Disposable cups, whether of paper or molded plastic, are either conical or frusto-conical in shape. Many of them are formed with a bead or rolled rim at the open end of the cup. This bead or rolled rim is provided to give a better drinking lip or rim than that of a cup having a raw or unrolled rim. It is also provided to strengthen the mouth of the cup and to assist in maintaining the circular shape of the open end thereof.

Most of the cup dispensers in use today have a tendency to distort the mouth of the cup during withdrawal. Those having spring-loaded knobs or shoulders tend to pinch the mouth of the cup out of round. Those having knobs or shoulders which do not yield at all during withdrawal, distort the mouth of the cup even more.

It is, therefore, the first object of this invention, to provide a dispenser for cups in which the cup retainer means does not distort the mouth of the cup during withdrawal, while having a sufficient gripping or retaining action to hold the cups in position, in a vertical stack, in an open-bottomed dispenser.

Another object of the invention is to provide a dispenser in the form of a cylindrical housing suitably supported on a wall or the like, having a closed upper end and an open lower end into which the stack of articles may be inserted, means being provided to retain the stack of articles in the housing and permit them to be withdrawn from said open lower end one at a time without distortion of the articles.

Another object is to provide the retaining means in the form of flexible bristles extending from the inner wall of the housing toward the stack of articles, the inner ends of the bristles defining a cylinder of slightly less internal diameter than the external diameter of the rims of the articles whereby some bristles project between the rims of adjacent cups and others engage the rims, thereby serving to support several of the lowermost articles and to separate them gradually as articles are removed one at a time from the lower end of the stack, the flexibility of the bristles permitting ready removal yet resisting the force of gravity acting on the stack of articles to retain them with the exception of the lowermost article when it is grasped and withdrawn from the cylindrical housing.

A further object is to provide retainer means formed of resilient bristles so that they are of substantial character such as to withstand wear and are therefore long-lasting.

Still a further object is to provide a band within the cylindrical housing for supporting the bristles in proper position for performing their intended functions.

An additional object is to provide a comparatively simple structure from the standpoint of formed parts and assembly during manufacture in which a flexible strip is provided to form the band above referred to and has the bristles integrally formed therewith of plastic material.

Another additional object is to provide the strip of such curvature that when the two ends of the strip are joined it assumes the shape of an inverted truncated cone, whereby the bristles formed thereon may be progressively shorter toward the lower edge of the band so that the cylinder defined by the inner ends of the bristles is substantially the same diameter throughout, and the bristles progressively stiffer toward the lower end of the housing, thereby producing a superior retaining function for the articles and an efficient means to progressively separate several of the lowermost articles as they are worked downwardly in the dispenser by successive withdrawals of single articles from the lower end of the stack.

With these and other objects in view, our invention consists in the construction, arrangement and combination of the various parts of our dispenser, whereby the objects above contemplated are attained, as hereinafter more fully set forth, pointed out in our claims and illustrated in detail on the accompanying drawing, wherein:

FIG. 1 is a side elevation of a dispenser embodying our invention, the upper and lower portions thereof being broken away and sectioned to show a stack of containers retained in the dispenser for withdrawal therefrom;

FIG. 2 is an enlarged sectional view of a portion of FIG. 1 showing some of the retainer bristles and the action thereof on the articles in greater detail; and FIG. 3 is a layout view of a combined supporting strip and bristle member forming part of our invention.

On the accompanying drawing we have used the reference character H to indicate in general a cylindrical housing and A to indicate a container such as a paper or plastic cup. The housing H comprises an upper cylinder 10 and a lower cylinder 12 which may be molded of plastic material such as polyethylene or polypropylene and may be connected together by an internal connecting band 14 also of plastic material, the three parts being cemented together at the point where the bottom of cylinder 10 abuts the top of the cylinder 12.

The articles A when in the form of paper or plastic cups may comprise cup portions 16 and rims 18, the cup portions being tapered as illustrated so that the cups are readily stacked and a stack of them may be inserted into a lower open end 34 of the lower cylinder 12.

We provide a novel means for retaining the stack of cups A in the housing H in such manner as to permit them to be withdrawn from the housing one at a time. Such means comprises flexible bristles 22 extending from the inner wall of the housing toward the stack of cups with the inner ends of the bristles defining a cylinder of slightly less internal diameter than the external diameter of the rims 18 as illustrated in FIG. 2. Preferably, these bristles are also formed of plastic material such as polyethylene or polypropylene and we have found a convenient manner of supporting them by means of a band-like supporting strip 20. The band itself may be in the form of a curved strip, such as shown in FIG. 3 of plastic material and the bristles 22 may be integrally formed therewith by molding techniques well known in the art. Due to the curvature of the strip 20 as shown in FIG. 3, when it is formed into a band and assembled in the housing H the band is shaped like a truncated cone.

To retain the band in position the lower cylinder 12 may have an annular recess or peripheral seat 24 formed therein and the connecting band 14 may have an annular recess 26 formed therein so that the lower edge thereof is spaced from the inner surface of the lower cylinder. Also as shown in FIG. 3, the bristles 22 need not extend all the way around the band 20 but can be provided in groups.

The action of the bristles with respect to the cup rims is illustrated in detail in FIG. 2. After a stack of cups A has been inserted upwardly into the dispenser through the open lower end 34 thereof, as shown in FIG. 1, the bristles 22 will resiliently engage the rims 18, as illustrated, to retain the stack in position. The lowermost cup can be removed by grasping it and pulling it downwardly. As it is pulled downwardly its rim 18 will riffle the bristles 22 and the removal operation will act to separate the lowermost cups. The resilient bristles will snap into the space between the rims as shown in FIG. 2 to progressively separate the few lowermost cups for subsequent ready removal of the lowermost cup.

Since the bristles project slightly under the rims 18 and there are a great number of them, a considerable proportion of which are curved downwardly by the rims, their tendency to return to their original shape provides sufficient support for the stack of cups, yet permits comparatively easy removal of the lowermost cup regardless of whether the stack of cups is a full stack or only a few. We have found that resilient bristles of plastic material coacting with the cup rims as disclosed provides a very efficient retaining means for the stack of cups, yet permits individual removal of the cups without distorting them as in many types of dispensers having solid projections engaging under the cup rims.

From the foregoing specification it will be obvious that we have provided a simple and efficient retaining means for cups or the like in a dispenser which accomplishes the objects contemplated. Some changes may be made in the construction and arrangement of the parts of our dispenser without departing from the real spirit and purpose of our invention and it is our intention to cover by our claims any modified forms of structure or use of mechanical equivalents which may reasonably be included within their scope.

We claim as our invention:

1. A dispenser for removing cups one at a time from a nested stack, said cups having a rim at the top edge thereof, comprising an upper cylinder, a lower cylinder aligned with said upper cylinder and having its top edge adjacent the bottom edge of said upper cylinder, band means disposed within said cylinders at said adjacent edges for securing said cylinders together, the lower edge of the band being spaced from the inner surface of said lower cylinder, said lower cylinder terminating at its lower end in a peripheral seat, a bristle-supporting strip having resilient bristles projecting therefrom, said strip being disposed within said lower cylinder with the bristles extending radially inwardly, the lower edge of the strip being seated in said peripheral seat and the upper edge of said strip being interposed in said space, thereby securing said strip to said lower cylinder, said bristles being sufficiently stiff to support said stack of cups by engaging the rims of several of the lowermost cups in said stack and sufficiently resilient to snap into the space between the rims of adjacent nested cups to separate them when the bristles are riffled by removing the bottom cup from said stack.

2. A dispenser in accordance with claim 1 wherein said bristles are integrally formed with said strip from plastic material.

3. A dispenser in accordance with claim 1 wherein said bristles are formed in groups spaced along said strip.

4. A dispenser for cups disposed therein in a nested stack, said cups having a rim at the top edge thereof, comprising a cylinder having a lower open end and being tapered toward said open end, supporting means for said stack comprising a strip of resilient plastic material having bristles molded integrally therewith, said strip being secured to the inner surface of said cylinder near said open end with the bristles extending radially inwardly, said bristles being progressively shorter toward the open end to compensate for the taper of the cylinder and to define at the inner ends thereof a cylinder of uniform diameter slightly smaller than the diameter of the cups at the rim, said bristles being stiffer at the lower edge than at the top edge of said strip because of their shortened length, thereby providing increasing resistance to downawrd force imposed on the cups to support the stack and to cause the cups to become separated as they advance past the bristles by the action of the bristles against the rims of the cups.

5. A dispenser in accordance with claim 4 where said strip in its flat condition is curved to provide a truncated cone-shaped band having its smaller end directed toward said open end.

*6. A dispenser for removing cups one at a time from a nested stack, said cups having a rim at the top edge thereof, comprising a housing having an upper portion, a lower portion aligned with said upper portion and having its top edge adjacent the bottom edge of said upper portion, band means disposed within said portions at said adjacent edges for securing said portions together, the lower edge of the band being spaced from the inner surface of said lower portion, said lower portion terminating at its lower end in a peripheral seat, a bristle-supporting strip having resilient bristles projecting therefrom, said strip being disposed within said lower portion with the bristles extending radially inwardly, the lower edge of the strip being seated in said peripheral seat and the upper edge of said strip being interposed in said space, thereby securing said strip to said lower portion, said bristles being sufficiently stiff to support said stack of cups by engaging the rims of several of the lowermost cups in said stack and sufficiently resilient to snap into the space between the rims of adjacent nested cups to separate them when the bristles are riffled by removing the bottom cup from said stack.*

*7. A dispenser in accordance with claim 6 wherein said bristles are integrally formed with said strip from plastic material.*

*8. A dispenser in accordance with claim 6 wherein said bristles are formed in groups spaced along said strip.*

*9. A dispenser for cups disposed therein in a nested stack, said cups having a rim at the top edge thereof, comprising a housing having a lower open end, supporting means for said stack comprising a strip of resilient plastic material having bristles molded integrally therewith, said strip being secured to the inner surface of said housing near said open end with the bristles extending radially inwardly, said bristles being progressively shorter toward the open end and defining at the inner ends thereof a cylinder of uniform diameter slightly smaller than the diameter of the cups at the rim, said bristles being stiffer at the lower edge than at the top edge of said strip because of their shortened length, thereby providing increasing resistance to downward force imposed on the cups to support the stack and to cause the cups to become separated*

*as they advance past the bristles by the action of the bristles against the rims of the cups.*

*10. A dispenser in accordance with claim 9 wherein said strip in its flat condition is curved to provide a truncated cone-shaped band having its smaller end directed toward said open end.*

References Cited

The following references, cited by the Examiner, are of record in the patented file of this patent or the original patent.

UNITED STATES PATENTS

| | | | |
|---|---|---|---|
| 614,772 | 11/1898 | Siegel | 221—308 X |
| 1,975,649 | 10/1934 | Reifsnyder | 221—308 |
| 2,543,746 | 3/1951 | Morrison | 221—307 |
| 2,584,941 | 2/1952 | Taubert | 221—63 |
| 2,614,687 | 10/1952 | Roy | 221—308 |
| 2,729,528 | 1/1956 | Bennett | 221—63 |
| 2,771,216 | 11/1956 | Reiner | 221—307 X |
| 3,193,139 | 7/1965 | Iannone et al. | 221—308 X |

STANLEY TOLLBERG, Primary Examiner